(12) United States Patent
Lin

(10) Patent No.: US 7,397,527 B2
(45) Date of Patent: Jul. 8, 2008

(54) IN-PLANE SWITCHING LIQUID CRYSTAL DISPLAY HAVING FAST RESPONSE TIME

(75) Inventor: Tze-Min Lin, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 263 days.

(21) Appl. No.: 11/288,773

(22) Filed: Nov. 28, 2005

(65) Prior Publication Data

US 2006/0114389 A1    Jun. 1, 2006

(30) Foreign Application Priority Data

Nov. 26, 2004    (TW) .............................. 93136464 A

(51) Int. Cl.
*G02F 1/1337* (2006.01)
*G02F 1/1343* (2006.01)

(52) U.S. Cl. ...................................... 349/123; 349/141
(58) Field of Classification Search ......... 349/123–124, 349/141, 96
See application file for complete search history.

(56) References Cited

U.S. PATENT DOCUMENTS

| | | | |
|---|---|---|---|
| 5,995,186 A * | 11/1999 | Hiroshi | 349/141 |
| 6,266,116 B1 * | 7/2001 | Ohta et al. | 349/141 |
| 6,288,763 B1 * | 9/2001 | Hirota | 349/141 |
| 6,400,430 B2 * | 6/2002 | Nakao et al. | 349/89 |
| 6,577,368 B1 | 6/2003 | Yuh et al. | |
| 6,859,248 B2 * | 2/2005 | Matsumoto et al. | 349/141 |
| 6,950,167 B2 * | 9/2005 | Matsumoto et al. | 349/141 |

* cited by examiner

*Primary Examiner*—James A Dudek
(74) *Attorney, Agent, or Firm*—Wei Te Chung

(57) ABSTRACT

An IPS LCD (100) includes a first and a second substrates (110, 120) opposite to each other, and a liquid crystal layer (130) sandwiched therebetween. A first polarizer (111) is disposed at an outer surface of the first substrate, and a second polarizer (121) is disposed at an outer surface of the second substrate. Polarizing axes of the first and second polarizers are parallel to each other. A plurality of pixel electrodes (160) and common electrodes (170) are disposed at the second substrate. A first alignment layer (114) is disposed at an inner surface of the first substrate, and a second alignment layer (124) is disposed at an inner surface of the second substrate. The first alignment layer maintains a rubbing direction of approximately 90° relative to the second alignment layer, and the second alignment layer has an anchoring strength greater than that of the first alignment layer.

11 Claims, 6 Drawing Sheets

IN-PLANE SWITCHING LIQUID CRYSTAL DISPLAY HAVING FAST RESPONSE TIME

FIELD OF THE INVENTION

The present invention relates to liquid crystal display devices, and more particularly to an in-plane switching mode liquid crystal display having a fast response time.

BACKGROUND

Liquid crystal displays (LCDs) are typically used as the information display in various devices such as computers and vehicle and airplane instrumentation. One type of LCD called the twisted nematic liquid crystal display (TN-LCD) often has the drawback of a narrow range of viewing angles. Thus an improved design called the in-plane switching liquid crystal display (IPS LCD) has been developed in order to provide a broad range of viewing angles. The IPS LCD typically has a plurality of common electrodes and a plurality of pixel electrodes all disposed on one of two opposite substrates, for driving liquid crystal molecules contained in a liquid crystal layer between the two substrates. The resulting electric field is substantially planar and parallel to surfaces of both substrates. The IPS LCD typically has a broad range of viewing angles.

According to the particular electrode array of its pixel electrodes and common electrodes, an IPS LCD can be classified as a single-domain type or a two-domain type. FIG. 6 is a schematic, exploded isometric view of a typical IPS LCD 10. The IPS LCD 10 includes a first substrate 11, a second substrate 12 opposite to the first substrate 11, and a liquid crystal layer 13 sandwiched between the substrates 11, 12. The liquid crystal layer 13 includes a multiplicity of liquid crystal molecules 18. A first and a second polarizers 14, 15 are formed at outer sides of the substrates 11, 12 respectively. A plurality of pixel electrodes 16 and common electrodes 17 are disposed parallel to each other at an inner surface of the second substrate 12. A first alignment layer (not shown) is disposed at an inner surface of the first substrate 11. A second alignment layer (not shown) is disposed at the inner surface of the second substrate 12, the second alignment layer covering the pixel and the common electrodes 16, 17. Original rubbing directions of the first alignment layer and the second alignment layer are parallel to each other. Long axes of the liquid crystal molecules 18 adjacent to the alignment layers are approximately parallel to the first and the second substrates 11, 12. Polarizing axes of the first and second polarizers 14, 15 are perpendicular to each other.

When no voltage is applied to the pixel and common electrodes 16, 17, the long axes of the liquid crystal molecules 18 maintain an angle relative to the pixel and common electrodes 16, 17. Light beams are emitted from a back light module (not shown) below the second substrate 12. When the light beams pass through the liquid crystal layer 15, their polarizing directions do not change, and the light beams are absorbed by the first polarizer 14. Thus the IPS LCD 10 is in an "off" state, and cannot display images.

As shown in FIG. 7, when a voltage is applied to the pixel and common electrodes 16, 17, an electric field E1 is generated between the pixel and common electrodes 16, 17. A direction of the electric field E1 is parallel to the second substrate 12, and perpendicular to the pixel and common electrodes 16, 17. The long axes of the liquid crystal molecules 18 twist to align in the direction of the electric field E1. When light beams pass through the liquid crystal layer 13, the polarization state of the light beams is converted to match the polarizing axis of the first polarizer 14. Thus the light beams pass through the first polarizer 14 to display images, and the IPS LCD 10 is in an "on" state.

When the voltage is applied, all the liquid crystal molecules 18 are aligned in the same new direction according to the electric field E1. When the voltage is switched off and the IPS LCD 10 returns to the "off" state, the liquid crystal molecules 18 twist to align in the original direction according to the first and second alignment layers. The amount of time needed for all the liquid crystal molecules 18 to realign is relatively long. This means that the response time of the IPS LCD 10 is unduly long.

What is needed, therefore, is an IPS LCD which overcomes the above-described problems.

SUMMARY

One preferred embodiment of an IPS LCD includes a first substrate and a second substrate opposite to each other, and a twisted nematic liquid crystal layer sandwiched between the first and second substrates. A first polarizer is disposed at an outer surface of the first substrate, and a second polarizer is disposed at an outer surface of the second substrate. Polarizing axes of the first and second polarizers are parallel to each other. A plurality of pixel and common electrodes are disposed at the second substrate. A first alignment layer is disposed at an inner surface of the first substrate, and a second alignment layer is disposed at an inner surface of the second substrate. The first alignment layer maintains a rubbing direction of approximately 90° relative to the second alignment layer, and the second alignment layer has an anchoring strength larger than that of the first alignment layer.

Because the anchoring strength of the second alignment layer is greater than that of the first alignment layer, the liquid crystal molecules adjacent to the second alignment layer quickly twist to an alignment with the first and second alignment layers when an applied voltage is switched off. Linearly-polarized light can then immediately be prevented from passing through the first polarizer for display. That is, the liquid crystal molecules may twist in a short time by the effect of the larger anchoring strength of the second alignment layer, which improves the response time of the IPS LCD.

Other advantages and novel features will become more apparent from the following detailed description when taken in conjunction with the accompanying drawings.

DETAILED DESCRIPTION OF PREFERRED EMBODIMENTS

Figure 1:
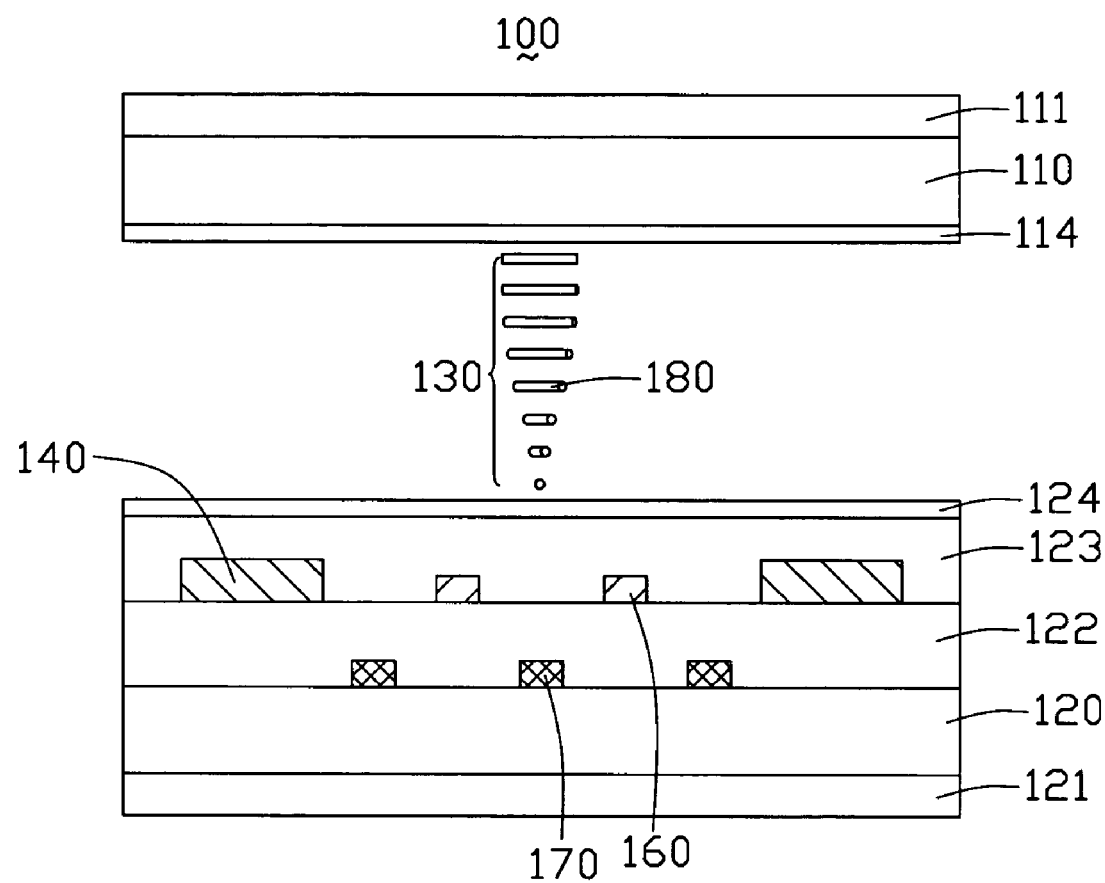
FIG. 1 is a schematic, side cross-sectional view of an IPS LCD according to a first embodiment of the present invention, showing the IPS LCD in an off state.

As shown in FIG. 1, an IPS LCD 100 according to a first embodiment of the present invention includes a first substrate 110, a second substrate 120 opposite to the first substrate 110, and a liquid crystal layer 130 sandwiched between the first and second substrates 110, 120. The liquid crystal layer 130 includes a multiplicity of twisted nematic liquid crystal molecules 180. A first polarizer 111 is disposed at an outer side of the first substrate 110. A second polarizer 121 is disposed at an outer side of the second substrate 120.

The first substrate 110 includes a first alignment layer 114 disposed at an inner side thereof. The second substrate 120 includes a plurality of strip-shaped common electrodes 170 formed at an inner side thereof, and an insulation layer 122 that covers the common electrodes 170 and the second substrate 120. A plurality of strip-shaped pixel electrodes 160 and data lines 140 are disposed on the insulation layer 122, and a passivation layer 123 covers the pixel electrodes 160, the data lines 140, and the insulation layer 122. A second alignment layer 124 is disposed on the passivation layer 123. The insulation layer 122 and the passivation layer 123 may be made from $SiO_2$ or $SiN_x$, wherein x is a natural number.

A pretilt angle of the first and second alignment layers 114, 124 is in a range of 0 to 10 degrees, which enables long axes of the liquid crystal molecules 180 to be aligned approximately parallel to the first and second substrates 110, 120. The first alignment layer 114 maintains a rubbing direction of approximately 90° relative to that of the second alignment layer 124. An anchoring strength of the second alignment layer 124 is greater than that of the first alignment layer 114.

A polarizing axis of the first polarizer 111 is parallel to the rubbing direction of the first alignment layer 114. The long axes of the liquid crystal molecules 180 adjacent the first alignment layer 114 are parallel to the polarizing axis of the first polarizer 111. The polarizing axis the first polarizer 111 is parallel to a polarizing axis of the second polarizer 121, and the polarizing axis of the second polarizer 121 is perpendicular to the rubbing direction of the second alignment layer 124. The long axes of the liquid crystal molecules 180 adjacent the second alignment layer 124 are perpendicular to the polarizing axis of the second polarizer 121.

When no voltage is applied to the common and pixel electrodes 170, 160, the liquid crystal molecules 180 are aligned such that they progressively twist a total of 90° from the second alignment layer 124 to the first alignment layer 114. Light beams emitted by a back light module (not shown) below the second polarizer 121 may pass through the second polarizer 121, and become linearly-polarized light parallel to the polarizing axis of the second polarizer 121. Then the linearly-polarized light passes through the liquid crystal layer 130, and the polarizing direction of the linearly-polarized light is rotated about 90°. As a result, the linearly-polarized light has a polarization state perpendicular to the polarizing axis of the first polarizer 111, and is absorbed by the first polarizer 111. The linearly-polarized light is not output from the LCD 100 for displaying images. Thus, the IPS LCD 100 is in an "off" state.

Figure 2:
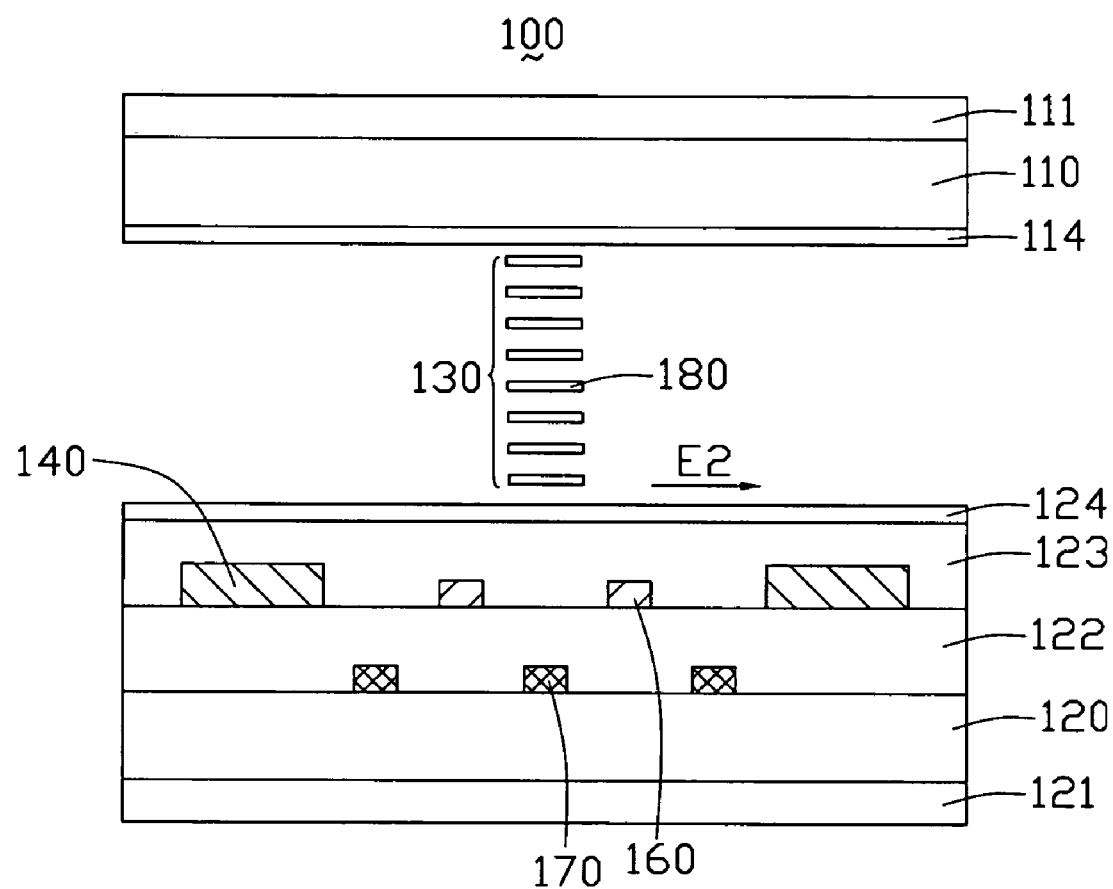
FIG. 2 is similar to FIG. 1, but showing the IPS LCD in an on state.

Referring to FIG. 2, this is similar to FIG. 1 but showing the LCD 100 in an on state. When a voltage is applied to the common and pixel electrodes 170, 160, an electric field E2 is generated. The electric field E2 is parallel to the first and second substrates 110, 120, and the liquid crystal molecules 180 are driven to align with the electric field E2. Thus when the linearly-polarized light passes through the liquid crystal layer 130, the polarizing direction of the linearly-polarized light does not change. The linearly-polarized light can then pass through the first polarizer 111 for displaying images. Thus, the IPS LCD 100 is in an "on" state.

When the voltage is applied, all the liquid crystal molecules 180 are aligned in the same new direction according to the electric field E2. When the voltage is switched off, the IPS LCD 100 returns to the "off" state, and the liquid crystal molecules 180 twist to align in the original directions according to the first and second alignment layers 114, 124. Because the anchoring strength of the second alignment layer 124 is greater than that of the first alignment layer 114, the liquid crystal molecules 180 adjacent to the second alignment layer 124 quickly twist to the positions in which they are aligned with the first and second alignment layers 114, 124. The linearly-polarized light can then immediately be prevented from passing through the first and second polarizers 111, 121. That is, the liquid crystal molecules 180 may twist in a short time by the effect of the greater anchoring strength of the second alignment layer 124, which improves the response time of the IPS LCD 100. Further, because the IPS LCD 100 utilizes in-plane switching, the viewing angle characteristics of the IPS LCD 100 are excellent.

Figure 3:
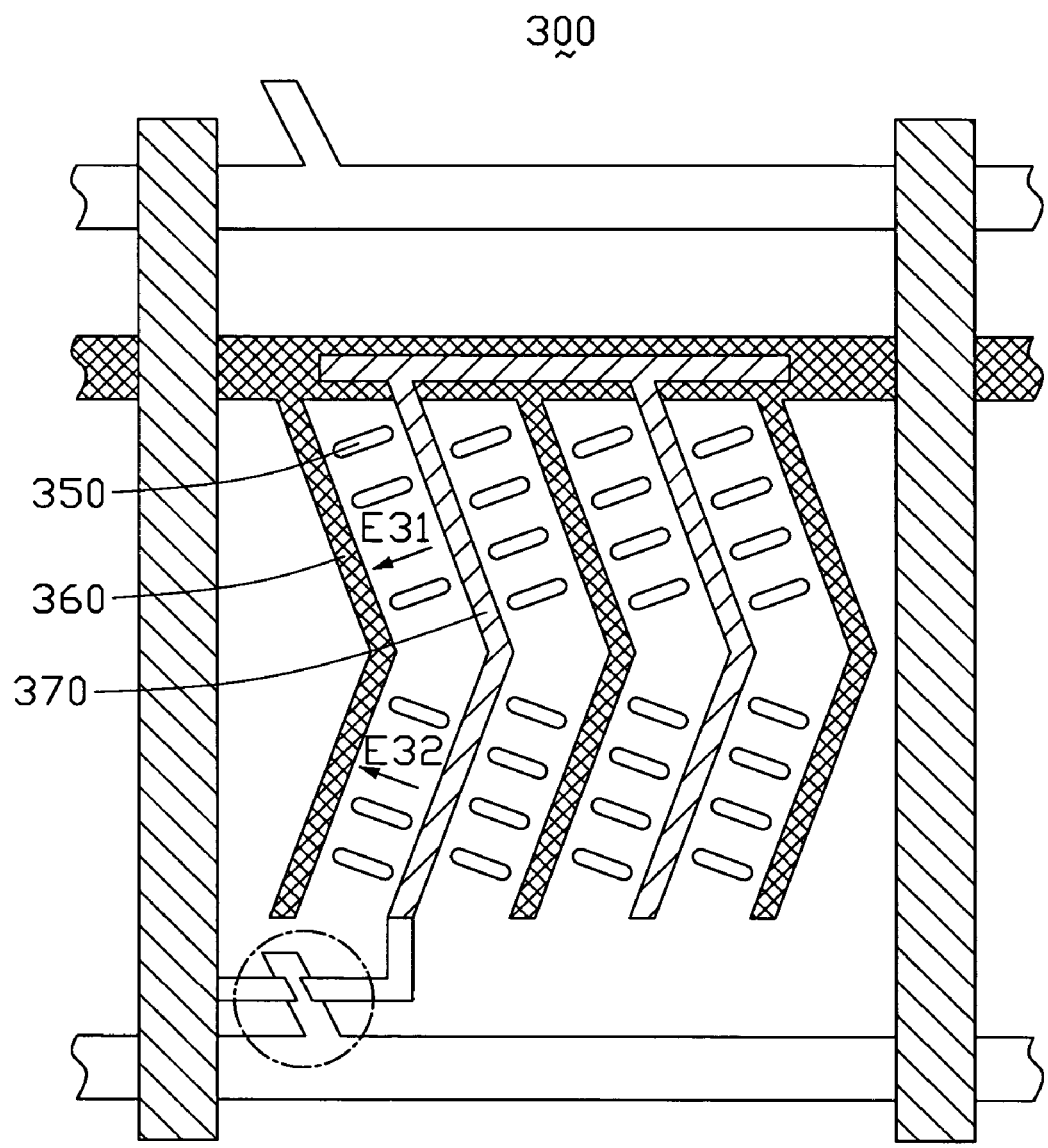
FIG. 3 is a schematic, top cross-sectional view of part of an IPS LCD according to a second embodiment of the present invention.

Referring to FIG. 3, this shows part of an IPS LCD 300 according to a second embodiment of the present invention. The IPS LCD 300 has a structure similar to that of the IPS LCD 100 of the first embodiment. However, common electrodes 360 and pixel electrodes 370 of the IPS LCD 300 are rectilinearly bent. The common electrodes 360 and the pixel electrodes 370 are arranged parallel to each other in an alternating pattern. When a voltage is applied to the common and pixel electrodes 360, 370, an electric field in two directions E31, E32 is generated. Liquid crystal molecules 350 twist in two different directions according to the electric field, for controlling a display of the IPS LCD 300. The liquid crystal molecules 350 help eliminate a color shift such as that which may exist in the LCD 100 due to the single directional alignment of the liquid crystal molecules 180 thereof. That is, the liquid crystal molecules 350 can provide better performance and display characteristics for the IPS LCD 300.

Figure 4:
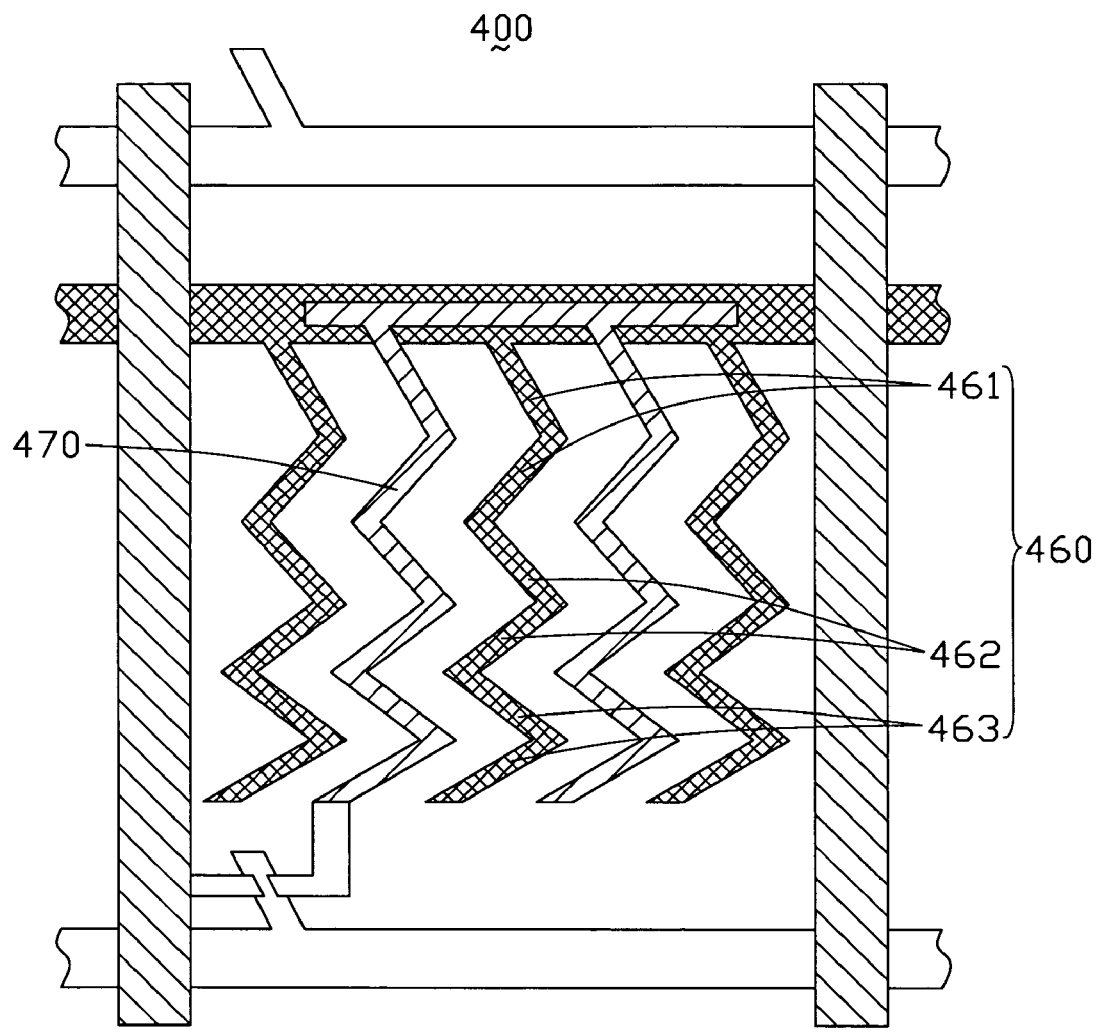
FIG. 4 is a schematic, top cross-sectional view of part of an IPS LCD according to a third embodiment of the present invention.
Figure 5:
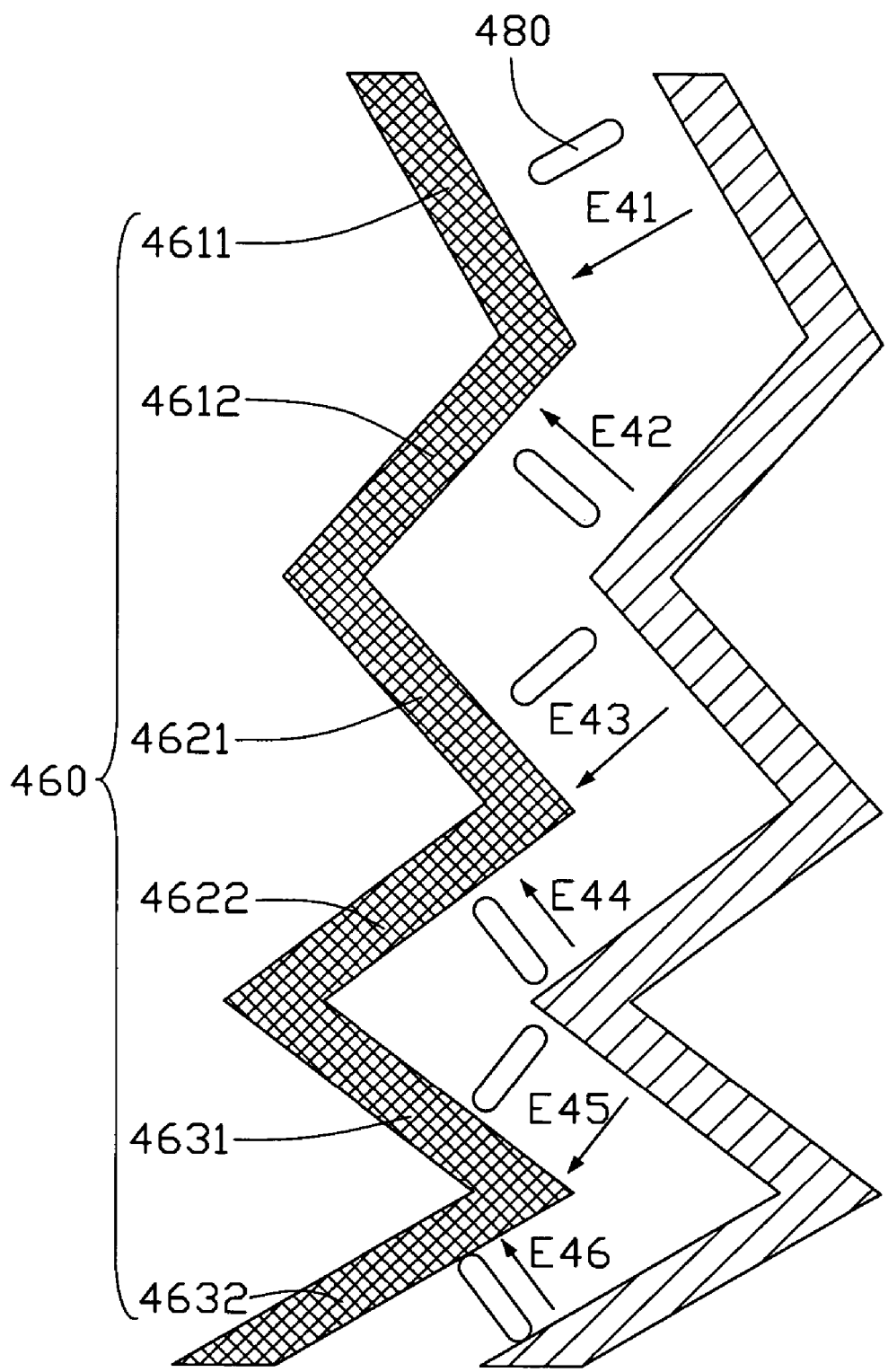
FIG. 5 is an enlarged view of one common electrode and one pixel electrode of the IPS LCD shown in FIG. 4, showing orientations of liquid crystal molecules between the common and pixel electrodes.
Figure 6:
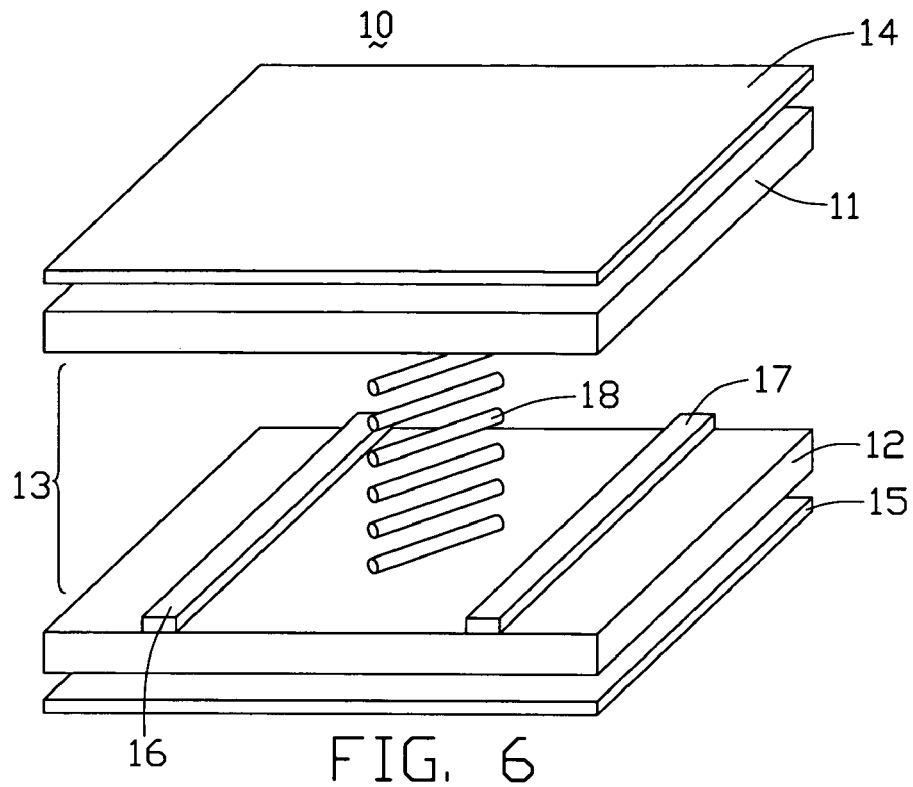
FIG. 6 is a schematic, exploded isometric view of a conventional IPS LCD, showing the IPS LCD in an off state.
Figure 7:
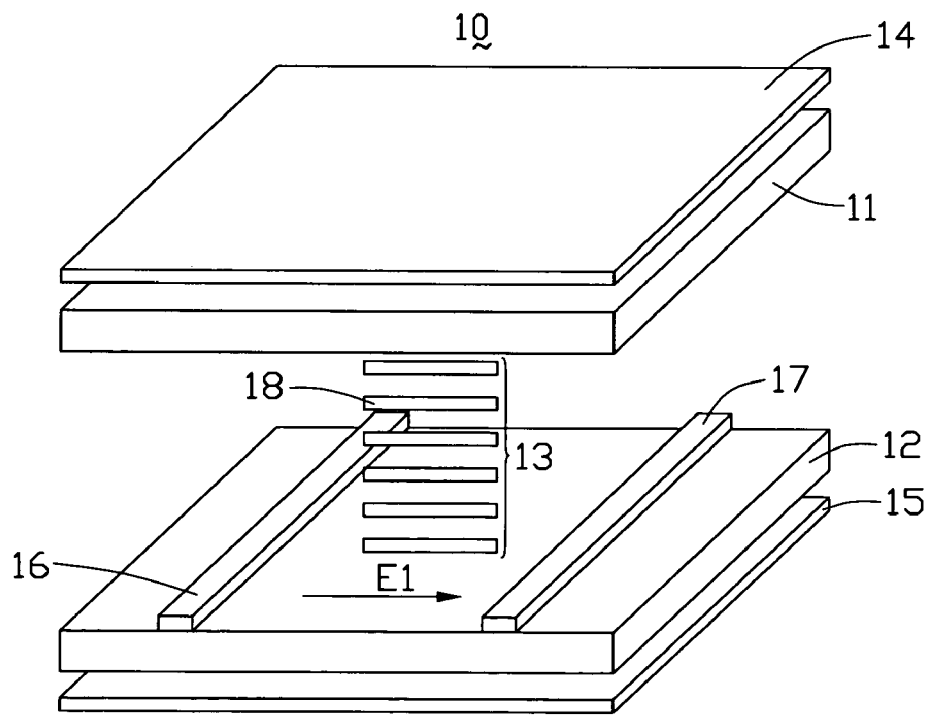
FIG. 7 is similar to FIG. 6, but showing the IPS LCD in an on state.

Referring to FIG. 4 and FIG. 5, these show parts of an IPS LCD 400 according to a third embodiment of the present invention. The IPS LCD 400 has a structure similar to that of the IPS LCD 300 of the second embodiment. However, each of common electrodes 460 of the IPS LCD 400 has a zigzagged configuration that includes a first bent portion 461, a second bent portion 462, and a third bent portion 463. As shown in FIG. 5, the first bent portion 461, the second bent portion 462, and the third bent portion 463 respectively have a first side 4611, 4621, and 4631, and a second side 4612, 4622, and 4632. The first sides 4611, 4621, and 4631 are nonparallel relative to each other, and the second sides 4612, 4622, and 4632 are nonparallel relative to each other. Each of pixel electrodes 470 of the IPS LCD 400 has a zigzagged configuration, with the common electrodes 460 and the pixel electrodes 470 being arranged parallel to each other in an alternate pattern. When a voltage is applied to the common and pixel electrodes 460, 470, an electric field having six directions E41, E42, E43, E44, E45, E46 is generated. Liquid crystal molecules 480 twist in six different directions accordingly. The liquid crystal molecules 480 help eliminate a color shift such as that which may exist in the IPS LCD 100 due to the single directional alignment of the liquid crystal molecules 180 thereof. That is, the liquid crystal molecules 480 can provide better performance and display characteristics for the IPS LCD 400.

It is to be understood, however, that even though numerous characteristics and advantages of preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An in-plane switching liquid crystal display, comprising:
   a first substrate and a second substrate opposite to each other;
   a twisted nematic liquid crystal layer sandwiched between the first and second substrates;
   a first polarizer disposed at an outer surface of the first substrate, and a second polarizer disposed at an outer surface of the second substrate, polarizing axes of the first and second polarizers being parallel to each other;
   a plurality of pixel electrodes and a plurality of common electrodes disposed at the second substrate; and
   a first alignment layer disposed at an inner surface of the first substrate, and a second alignment layer disposed at an inner surface of the second substrate;
   wherein the first alignment layer maintains a rubbing direction of approximately 90° relative to the second alignment layer, and the second alignment layer has an anchoring strength greater than that of the first alignment layer.

2. The in-plane switching liquid crystal display as claimed in claim 1, wherein the first polarizer has a polanzing axis parallel to the rubbing direction of the first alignment layer.

3. The in-plane switching liquid crystal display as claimed in claim 2, wherein long axes of liquid crystal molecules of the liquid crystal layer adjacent the first alignment layer are generally parallel to the polarizing axis of the first polarizer.

4. The in-plane switching liquid crystal display as claimed in claim 3, wherein the second polarizer has a polarizing axis perpendicular to the rubbing direction of the second alignment layer.

5. The in-plane switching liquid crystal display as claimed in claim 4, wherein long axes of liquid crystal molecules of the liquid crystal layer adjacent to the second alignment layer are perpendicular to the polarizing axis of the second polarizer.

6. The in-plane switching liquid crystal display as claimed in claim 5, wherein the liquid crystal molecules progressively twist a total of about 90° from the second alignment layer to the first alignment layer when no voltage is applied.

7. The in-plane switching liquid crystal display as claimed in claim 1, wherein the pixel electrodes and the common electrodes are strip-shaped.

8. The in-plane switching liquid crystal display as claimed in claim 1, wherein an electric field generated between the pixel electrodes and the common electrodes has at least two different directions.

9. The in-plane switching liquid crystal display as claimed in claim 8, wherein the pixel electrodes and common electrodes have a rectilinearly bent shape.

10. The in-plane switching liquid crystal display as claimed in claim 8, wherein the pixel electrodes and common electrodes have a zigzagged shapes.

11. A method of assembling in-plane switching liquid crystal display, comprising:
    providing a first substrate and a second substrate opposite to each other;
    disposing a twisted nematic liquid crystal layer sandwiched between the first and second substrates;
    disposing a first polarizer at an outer surface of the first subs trate, and a second polaiizer at an outer surface of the second substrate, polarizing axes of the first and second polarizers being parallel to each other;
    disposing a plurality of pixel electrodes and a plurality of common electrodes at the second substrate; and
    disposing a first alignment layer at an inner surface of the first substrate, and a second alignment layer disposed at an inner surface of the second substrate;
    wherein the first alignment layer maintains a rubbing direction of approximately 90° relative to the second alignment layer, and the second alignment layer has an anchoring strength greater than that of the first alignment layer.

* * * * *